US012809727B2

(12) United States Patent
Marrotte et al.

(10) Patent No.: US 12,809,727 B2
(45) Date of Patent: Nov. 24, 2026

(54) CHUNKING, STORING, AND RECOVERING OBJECT DATA WITH CLIENT ACCESSIBLE OBJECT METADATA

(71) Applicant: Dell Products L.P., Round Rock, TX (US)

(72) Inventors: Michael Marrotte, Windermere, FL (US); John P. Marchese, Jr., East Hampton, CT (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/026,074

(22) Filed: Jan. 16, 2025

(65) Prior Publication Data

US 2026/0203172 A1 Jul. 16, 2026

(51) Int. Cl.
*G06F 11/14* (2026.01)
*G06F 11/1446* (2026.01)

(52) U.S. Cl.
CPC ................................ *G06F 11/1469* (2013.01)

(58) Field of Classification Search
CPC .................................................. G06F 11/1469
See application file for complete search history.

(56) References Cited

U.S. PATENT DOCUMENTS

| | | | | |
|---|---|---|---|---|
| 11,036,594 B1 * | 6/2021 | Shats | G06F 11/1435 | |
| 12,235,736 B2 * | 2/2025 | Mufti | G06F 11/1464 | |
| 2015/0199367 A1 * | 7/2015 | Hammer | G06F 11/1448 | 707/654 |
| 2016/0154963 A1 * | 6/2016 | Kumar | G06F 21/602 | 713/189 |
| 2017/0315869 A1 * | 11/2017 | Rungta | G06F 3/067 | |
| 2019/0182322 A1 * | 6/2019 | Kumar | G06F 3/067 | |
| 2020/0026601 A1 * | 1/2020 | Ricker | G06F 3/061 | |
| 2025/0165472 A1 * | 5/2025 | Gladwin | G06F 16/2455 | |

OTHER PUBLICATIONS

"Unbreakable cloud storage for data centers" Scality, Ring. [https://go.scality.com/l/893901/2021-05-11/3zjql/893901/1669122729UuN3Dbco/Scality_RING_Whitepaper_A4_Web_221111.pdf?_gl=1*b0u261*_gcl_au*MjA4MTQwNDg1Mi4xNzI0Mz] retrieved May 29, 2025, 59 pages.
"Implementing multi-cloud storage solutions for redundancy" TATA Communications. Feb. 18, 2025. [https://www.tatacommunications.com/knowledge-base/multi-cloud-storage-solutions/] retrieved Aug. 25, 2025, 5 pages.

* cited by examiner

*Primary Examiner* — Merilyn P Nguyen
(74) *Attorney, Agent, or Firm* — Amin, Turocy & Watson, LLP

(57) ABSTRACT

The technologies described herein are generally directed to using object metadata to chunk, store, and recover object data. For instance, a system can, based on a first data object and a second data object, generate a recovery data object. The system may further identify first storage information corresponding to first storage configured to store the first data object, second storage information corresponding to second storage configured to store the second data object, and third storage information corresponding to third storage configured to store the recovery data object. The system may further, based on the first storage information, second storage information, and the third storage information, respectively, generate first metadata, second metadata, and third metadata, respectively included in the first data object, second data object, and the recovery data object.

20 Claims, 10 Drawing Sheets

CHUNKING, STORING, AND RECOVERING OBJECT DATA WITH CLIENT ACCESSIBLE OBJECT METADATA

BACKGROUND

Modern approaches to storing backup data may utilize distributed storage approaches, e.g., storing multiple copies of backup data in multiple locations and/or storing parts of data in different locations and reconstructing parts when needed. In some circumstances the management of the different storage locations may be complex and subject to reductions in efficiency, accessibility, and security, as compared to non-distributed approaches.

The above-described description is merely intended to provide a contextual overview regarding storage of backup data, and is not intended to be exhaustive.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method may include, based on a first data object and a second data object, generating a recovery data object. The method may further include identifying first storage information corresponding to first storage configured to store the first data object, second storage information corresponding to second storage configured to store the second data object, and third storage information corresponding to third storage configured to store the recovery data object. Further, the method may include, based on the first storage information, second storage information, and the third storage information, respectively, generating first metadata, second metadata, and third metadata, respectively included in the first data object, second data object, and the recovery data object.

Additionally or alternatively, the method may further include recovering the first data object based on the second metadata and the third metadata, resulting in a recovered first data object. Additionally or alternatively, recovering the first data object includes employing the second metadata to identify the third storage information, based on the third storage information, retrieving the recovery data object from the third storage, and combining the second data object and the recovery data object, resulting in the recovered first data object. Additionally or alternatively, the second metadata identifies the first storage as storing the first data object and the third storage as storing the recovery data object. Additionally or alternatively, the first storage includes cloud storage equipment associated with a cloud-storage provider.

Additionally or alternatively, the method may further include receiving an encryption key from a client system and, based on the encryption key, encrypting the first metadata. Additionally or alternatively, the method may further include, before generating the recovery data object, receiving, from a client system, the first data object and the second data object. Additionally or alternatively, the method may further include, based on client data received from a client system, generating the first data object and the second data object.

An example system can operate as follows. At least one memory may store computer executable instructions, and at least one processor may be configured to process the computer executable instructions that, when executed by the at least one processor, facilitate performance of operations. The operations may include communicating, to storage controller equipment, a first data block, a second data block, and a storage instruction applicable to storage of the first data block and the second data block, at a first cloud-storage location and a second cloud-storage location, respectively. The operations may further include retrieving, from the second cloud-storage location, metadata of the second data block representative of a third cloud-storage location different from the first cloud-storage location and the second cloud-storage location. Further, the operations may include, based on a parity data block retrieved from the third cloud-storage location and the second data block, reconstructing the first data block.

Additionally or alternatively, the metadata was generated by the storage controller equipment based on the storage instruction. Additionally or alternatively, the third cloud-storage location was selected by the storage controller equipment based on the storage instruction. Additionally or alternatively, the parity data block was generated by the storage controller equipment based on the first data block and the second data block. Additionally or alternatively, the operations further include communicating an encryption key to the storage controller equipment, and the retrieving of the metadata includes decrypting the metadata with the encryption key.

Additionally or alternatively, the first cloud-storage location and the third cloud-storage location respectively correspond to different cloud-storage providers. Additionally or alternatively, the metadata further includes the first cloud-storage location. Additionally or alternatively, the operations may further include, based on application data, generating the first data block and the second data block. Additionally or alternatively, the parity data block includes exclusive or data corresponding to the first data block and the second data block.

An example non-transitory machine-readable medium may include executable instructions that, when executed by at least one processor, facilitate performance of operations. The operations may include generating a first data chunk and a second data chunk, resulting in generated data chunks. The operations may further include, based on the generated data chunks, generating a recovery data chunk. Further, the operations may include storing the respective generated data chunks and the recovery data chunk at different network storage equipment, with the second data chunk including recovery instructions applicable to combining data of the second data chunk with recovery data of the recovery data chunk to recover unavailable data of the first data chunk.

Additionally or alternatively, the operations further include generating auxiliary data based on the different network storage equipment, wherein the second data chunk includes the auxiliary data, and wherein the recovery instructions are included in the auxiliary data. Additionally or alternatively, the operations further include retrieving the recovery instructions, and, based on the recovery instructions, identifying network storage equipment containing the recovery data chunk. The operations may further include retrieving the recovery data chunk from the network storage equipment, and employing bitwise recovery to recover the unavailable data from the second data chunk and the recovery data chunk.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Figure 1:
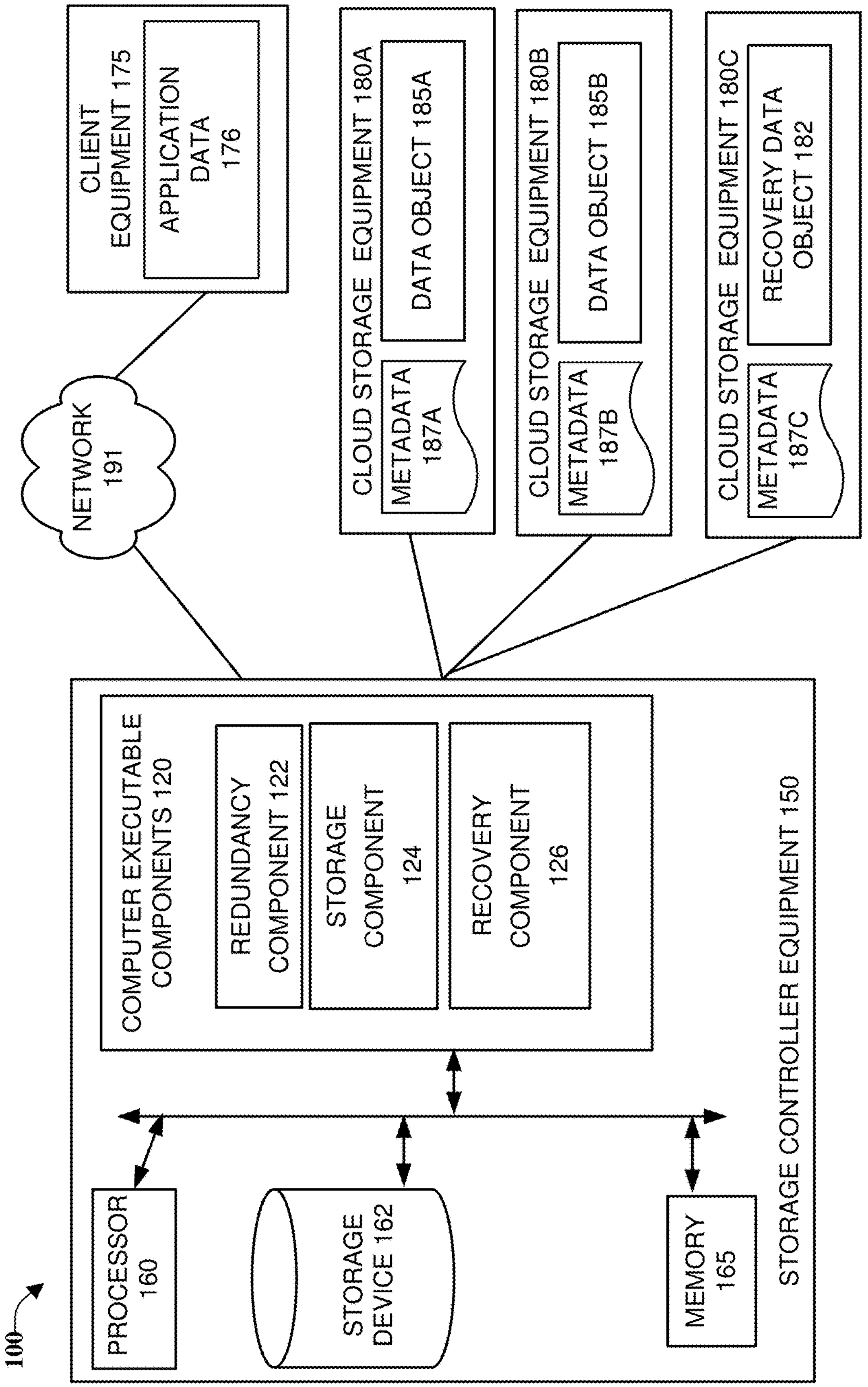
FIG. 1 is an architecture diagram of an example system that can facilitate using object metadata to chunk, store, and recover object data, in accordance with one or more embodiments.

Various specific details of the disclosed embodiments are provided in the description below. One skilled in the relevant art(s) will recognize, however, that the techniques described herein can in some cases be practiced without one or more of the specific details, or with other methods, components, materials, etc. In other instances, well-known structures, materials, or operations are not shown or described in detail to avoid obscuring subject matter.

By utilizing one or more implementations as described herein, the performance, efficiency, and management of systems that utilize distributed storage of data objects can be improved, e.g., by providing approaches that improve access and resiliency while also improving performance, reducing overhead and changes to client applications, and data security. One or more embodiments described herein are not abstract concepts; rather, they provide technical solutions to technical problems associated with the secure and resilient storage of data objects, providing technical solutions to technical problems that are inextricably tied to computer systems. For example, generally speaking, one or more embodiments may reduce the need for full backups, saving resources and costs. Moreover, implementations described herein can provide these solutions in a manner that cannot reliably be performed by a human or even a plurality of humans, e.g., solutions provided facilitate the generation and utilization of complex parity data structures that enable the rapid and accurate recovery of data stored at unavailable nodes.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Generally speaking, some examples described below may discuss object storage at a cloud storage provider, e.g., also termed cloud storage, cloud provider, storage provider. The term "provider" is used in some examples to specify that different entities/providers, may be selected to improve the resiliency of the data storage. These examples are non-limiting, and different aspects of embodiments may apply to different storage approaches, e.g., non-cloud based storage, storage offered by the same provider, and/or other storage approaches.

For convenience of explanation and to emphasize the breadth of applicability of concepts herein, different terms may be used to described different elements/processes utilized by embodiments. For example, data objects, may be termed data blocks, or data chunks. Recovery data objects may also be termed parity data blocks or recovery data chunks. Metadata may be termed auxiliary data or recovery instructions with storage information corresponding to storage locations and storage instructions for recovery.

FIG. 1 is an architecture diagram of an example system 100 that can facilitate using object metadata to chunk, store, and recover object data, in accordance with one or more embodiments. For purposes of brevity, description of like elements and/or processes employed in other embodiments is omitted. As depicted, system 100 includes storage controller equipment 150 connected, via network 191, to client equipment 175, and cloud storage equipment 180A-C. Cloud storage equipment 180A-C includes metadata 187A-C, data object 185A, data object 185B, and recovery object 182, respectively.

As depicted, storage controller equipment 150 can include memory 165 that can store one or more computer and/or machine readable, writable, and/or executable components 120 and/or instructions. In embodiments, storage controller equipment 150 can further include processor 160. In one or more embodiments, computer executable components 120, when executed by processor 160, can facilitate performance of operations defined by the executable component(s) and/or instruction(s). Computer executable components 120 can include redundancy component 122, storage component 124, recovery component 126, and other components described or suggested by different embodiments described herein, that can improve the operation of system 100. Storage controller equipment 150 may further include storage device 162. In an example, storage device 162 may provide nonvolatile storage of data, data structures, computer executable instructions, and so forth.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of redundancy component 122, which can in some implementations can, based on a first data object and a second data object, generate a recovery data object. For example, in one or more embodiments, redundancy component 122 may, based on a data objects 185A-B and recovery object 182.

In another example, memory 165 can store executable instructions that can facilitate generation of storage component 124, which in some implementations may identify first storage information corresponding to first storage configured to store the first data object, second storage information corresponding to second storage configured to store the second data object, and third storage information corresponding to third storage configured to store the recovery data object. For example, in one or more embodiments, storage component 124 can identify first storage information corresponding to cloud storage equipment 180A to store data object 185A, second storage information corresponding to cloud storage equipment 180B configured to store data object 185B, and third storage information corresponding to data object 185C configured to store recovery object 182.

In an example implementation, the first, second, and third storage may correspond to cloud storage services managed by different entities. Different factors may to relevant to the selection of storage locations, e.g., storage systems face risks such as data loss, outages, and breaches, and using storage from one provider may increase the likelihood that retrieval of more than one data object could fail, e.g., in examples described herein with two data objects and a recovery object, when one of the three objects are unavailable, the other two objects may be used to reconstruct the unavailable data object.

Additionally, one or more embodiments may utilize multiple storage providers to reduce the likelihood that performance, scalability, and cost-effectiveness of the object storage will affect operation of the storage system, e.g., when a provider is subject to performance degradation, other providers may not be subject to the same problems. Data security, performance and scalability of embodiments described herein may also be improved by providing the increased security of utilizing multiple providers without requiring full copies of stored data be stored at the different providers, e.g., backing up copies of data across multiple providers may be resource-intensive and costly as compared to other approaches.

In another example, memory 165 can store executable instructions that can facilitate generation of recovery component 126, which in some implementations may, based on the first storage information, second storage information, and the third storage information, respectively, generate first metadata, second metadata, and third metadata, respectively included in the first data object, second data object, and the recovery data object. For example, in one or more embodiments, recovery component 126 may, based on the respective locations of cloud storage equipment 180A-C, generate metadata for data object 185A-B and recovery object 182.

In one or more embodiments, providing the storage locations of cloud storage equipment 180A-C as client-defined/available metadata (e.g., specified by/available to client equipment 175) metadata in the data/recovery objects stored at cloud storage equipment 180A-C improves the capacity for client equipment 175 to access/recover stored data. One approach to providing this recovery capability utilizes the storage of recovery data (e.g., recovery object 182/parity data) at a location identified by metadata in the stored data objects, e.g., access to one data object, facilitates access to the other data objects or the recovery data object. This approach may provide additional benefits when utilizing multiple/otherwise unconnected cloud storage providers to store the data objects/recovery data.

Figure 2:
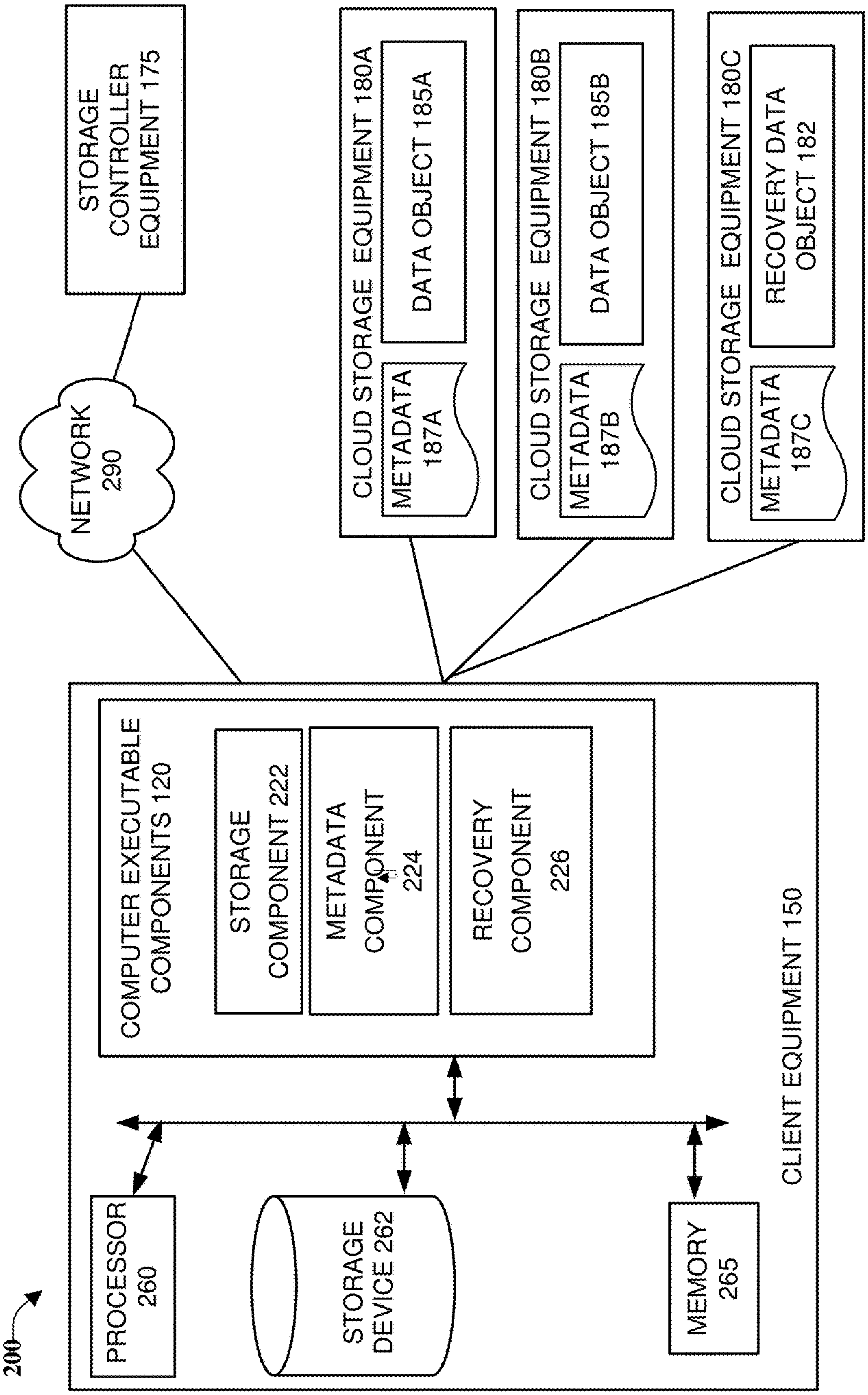
FIG. 2 is an architecture diagram of an example system that can facilitate using object metadata to chunk, store, and recover object data, in accordance with one or more embodiments.

FIG. 2 is an architecture diagram of an example system 200 that can facilitate using object metadata to chunk, store, and recover object data, in accordance with one or more embodiments. For purposes of brevity, description of like elements and/or processes employed in other embodiments is omitted. As depicted, system 200 includes client equipment 175 connected, via network 191, to storage controller equipment 150, and cloud storage equipment 180A-C. Cloud storage equipment 180A-C includes metadata 187A-C, data object 185A, data object 185B, and recovery object 182, respectively. Client equipment 175 includes processor 260, memory 265, storage device 262, and computer executable components 220.

In embodiments, processor 260 is similar to processor 160 and storage device 262 is similar to storage device 162, discussed above. According to multiple embodiments, memory 265 can store one or more computer and/or machine readable, writable, and/or executable components 220 and/or instructions. In one or more embodiments, computer executable components 220, when executed by processor 260, can facilitate performance of operations defined by the executable component(s) and/or instruction(s). Computer executable components 220 can include storage component 222, metadata component 224, recovery component 226, and other components described or suggested by different embodiments described herein, e.g., that can improve the operation of system 200, in accordance with one or more embodiments.

As discussed further with FIG. 10 below, network 290 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2(3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In an example implementation of client equipment 175, memory 265 can store executable instructions that can facilitate generation of storage component 222, which in some implementations may communicate, to storage controller equipment, a first data block, a second data block, and a storage instruction applicable to storage of the first data block and the second data block, at a first cloud-storage location and a second cloud-storage location, respectively. For example, one or more embodiments, storage component 222 may communicate, from client equipment 175 to storage controller equipment 150, a storage instruction specifying a location for cloud storage equipment 180A-B applicable to respectively store data objects 185A-B (e.g., data blocks).

In an example implementation of client equipment 175, memory 265 can further store executable instructions that can facilitate generation of metadata component 224, which in some implementations, may retrieve, from the second cloud-storage location, metadata of the second data block representative of a third cloud-storage location different from the first cloud-storage location and the second cloud-storage location. For example, in one or more embodiments, metadata component 224 may retrieve, from the second cloud-storage location corresponding to cloud storage equipment 180B, metadata of cloud storage 180C equipment storing recovery object 182.

In an example implementation of client equipment 175, memory 265 can further store executable instructions that can facilitate generation of recovery component 226, which in some implementations, may, based on a parity data block retrieved from the third cloud-storage location and the second data block, reconstruct/reassemble the first data block. For example, in one or more embodiments, recovery component 226 may, based on recovery object 182 (e.g., a parity data block) retrieved from cloud storage equipment 180C and data object 185B stored at cloud storage equipment 180B.

Figure 3:
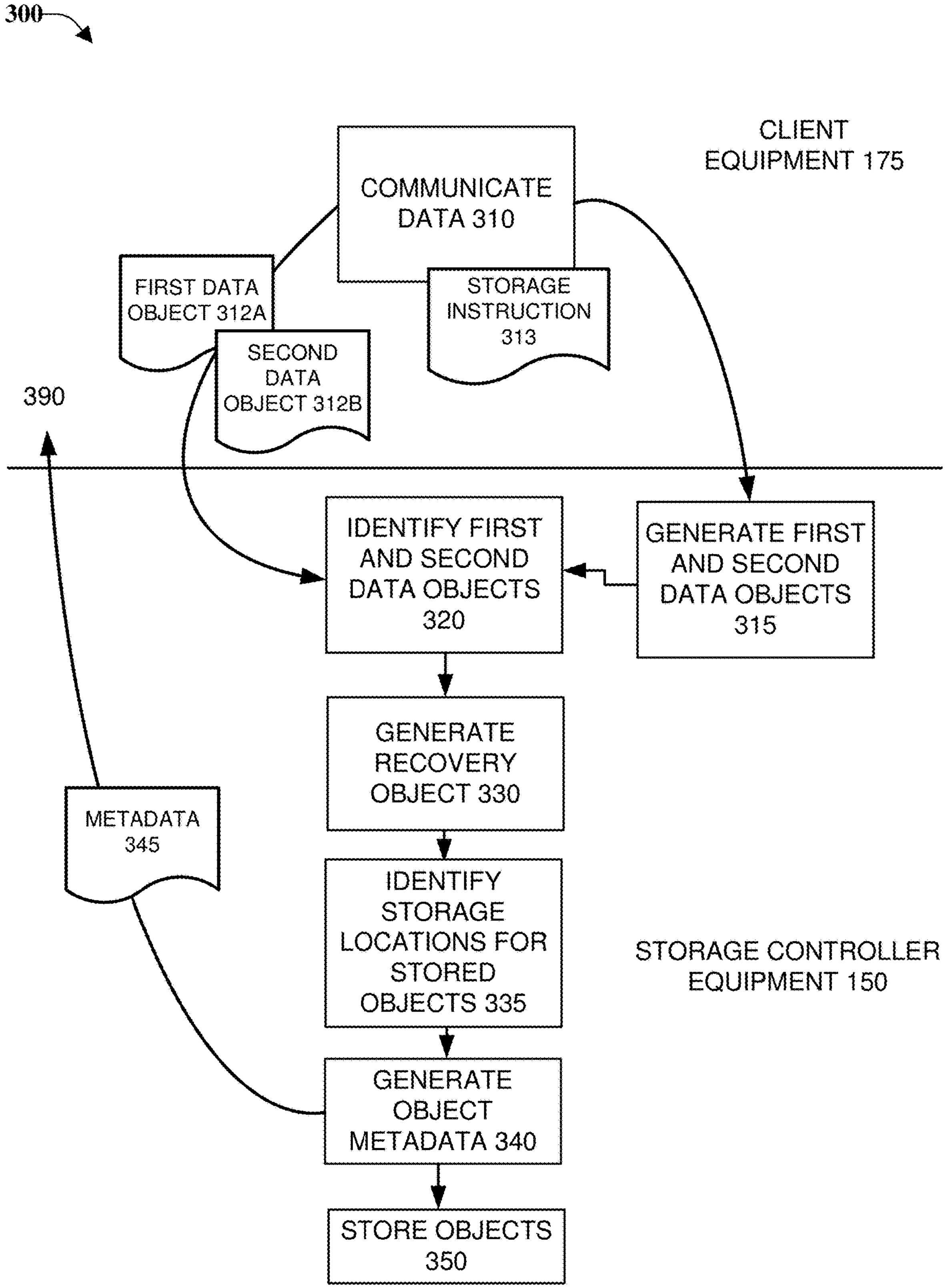
FIG. 3 includes a flow diagram that illustrates aspects of example system that can facilitate using object metadata to chunk, store, and recover object data, in accordance with one or more embodiments.

FIG. 3 includes a flow diagram that illustrates aspects of example system 300 that can facilitate using object metadata to chunk, store, and recover object data, in accordance with one or more embodiments. For purposes of brevity, description of like elements and/or processes employed in other embodiments is omitted. System 300 includes operations and data associated with client equipment 175 and storage controller equipment 150. Operations performed by client equipment 175 include communicate data 310 (e.g., data objects 312A-B and storage instruction 315)), and operations performed by storage controller equipment 150 include identify first and second data objects 320, generate recovery object 330, generate object metadata 340 (e.g., metadata 345), and store objects 350.

At 310, client data (e.g., application data 176) may be communicated from client equipment 175 to storage controller equipment 150. In an example, the data objects 312A-B may be generated by client equipment 175 and communicated to storage controller equipment 150 for further actions. Additionally or alternatively, the data to be stored may be communicated to storage controller equipment 150 wherein, at 320 the first and second data objects may be generated by storage controller equipment, e.g., by a chunking process that divides the data between the first and second data objects. In either example discussed above, along with communicating data, at 310, a storage instruction 313 may be included. In embodiments, storage instruction 313 may include client specified data storage locations, the layout of the recovery structure, and encryption characteristics for the data/recovery objects.

At 330, a recovery object may be generated from the first and second data objects. In examples discussed herein, two data parts may be combined with one recovery part to provide approaches to data recovery, given the unavailability of one of the three parts. This 2+1 layout specification is non-limiting, and different combinations of data objects, recovery objects, and minimum object availability for recovery may also be used by embodiments, e.g., with additional cloud storage equipment 180A-C storing additional data objects 185A-B and recovery data objects 182.

In some embodiments, by utilizing object metadata to store the location of the component data/recovery objects (e.g., as opposed to relying upon centralized management by storage controller equipment 150), improves recovery and resiliency of the backup system by preventing total data exposure in the event of a breach at one or more object providers (e.g., depending on the layout specification of the data/recovery structure. Having object metadata store data/recovery object locations may facilitate the use of multiple cloud storage providers by allowing the reference names of the chunk/parity to remain the same in for the different cloud storage providers.

At 335, storage location may be identified for storage of the first and second data objects, and the recovery object. This identification may result from client equipment 175 specifying the storage locations (e.g., with storage instruction 313), or from selection by storage controller equipment 150. At 340, based on the storage locations identified for storage of the storage of the first and second data objects, and the recovery object, object metadata may be generated to include with the stored objects. In an implementation, to facilitate the retrieval of the stored data objects, the storage location of the recovery object may be included with one or more of the data objects from which the recovery object was generated.

In an additional or alternative embodiment, after generation of object metadata 345, the object metadata may be returned to the client equipment 175. In this example, instead of, in or in addition to, employing storage controller equipment 150 for retrieval of data objects and recovery using the generated recovery object, client equipment may be utilized to retrieve and manage the stored data and recovery objects. This may be facilitated by the object metadata attached to the stored data objects (and relayed to client equipment 175 in this example) having the storage location of all of the data objects, e.g., first and second data objects, and recovery objects.

In this example, client equipment 175 may or may not perform the storing of the data and recovery objects. When client equipment 175 stores the objects, storage controller equipment 150 may communicate the recovery object generated at 340 to client equipment 175, e.g., for storage in accordance with the object metadata of the stored objects. One advantage that can result from using client equipment 175 to store the object metadata with the stored objects is the capability for client equipment 175 to encrypt and stored the metadata at the client equipment, e.g., improving data security by not providing unencrypted metadata to storage controller equipment 150. In this example, to utilize the recovery object, client equipment could decrypt the object metadata for the recovery object and perform the recovery operations, or client equipment 175 could communicate the decryption key for storage controller equipment 150 for performance of the recovery operation by client equipment 175.

Figure 4:
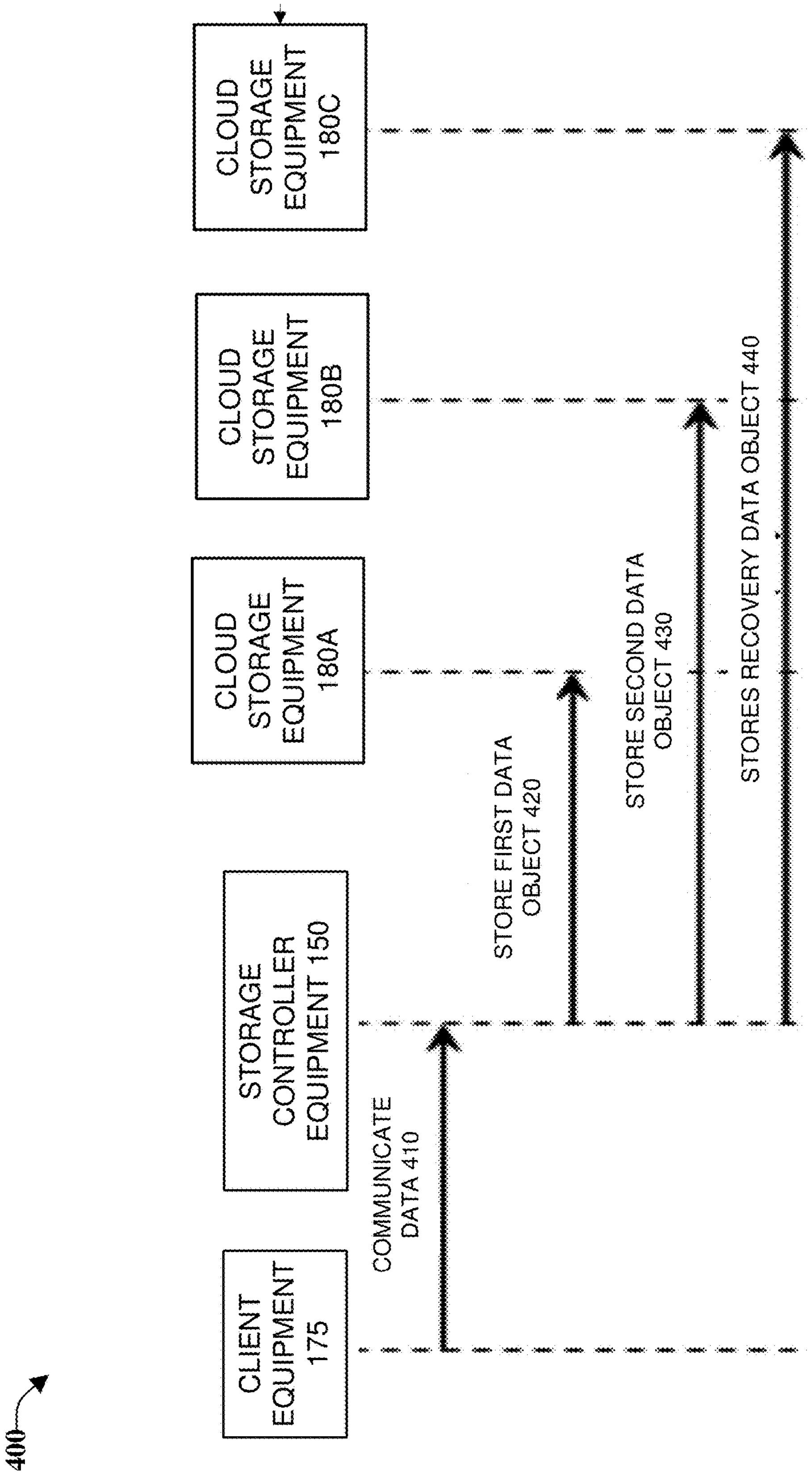
FIG. 4 includes a sequence diagram that illustrates aspects of example system that can facilitate using object metadata to chunk and store object data, in accordance with one or more embodiments.

FIG. 4 includes a sequence diagram that illustrates aspects of example system 400 that can facilitate using object metadata to chunk and store object data, in accordance with one or more embodiments. For purposes of brevity, description of like elements and/or processes employed in other embodiments is omitted. System 400 depicts exchange of data among storage controller equipment 150, client equipment 175, and cloud storage equipment 180A-C.

At 410, data is communicated from client equipment 175 to storage controller equipment. At 420, the first data object is stored at cloud storage equipment 180A, and at 430, the second data object is stored at cloud storage equipment 180B. At 440, the recovery data object is stored at cloud storage equipment 180C.

In an additional or alternative approach, client equipment may receive the generated recovery data object, generate the object metadata for the objects, and store the first and data objects along with the recovery data object generated by storage controller equipment. As discussed above, this approach may provide capabilities to client equipment that improve security and data accessibility by facilitating the identification of data/recovery object locations, and the encryption of data/metadata, e.g., object storage locations, instructions for use of recovery object to reconstruct unavailable data.

Figure 5:
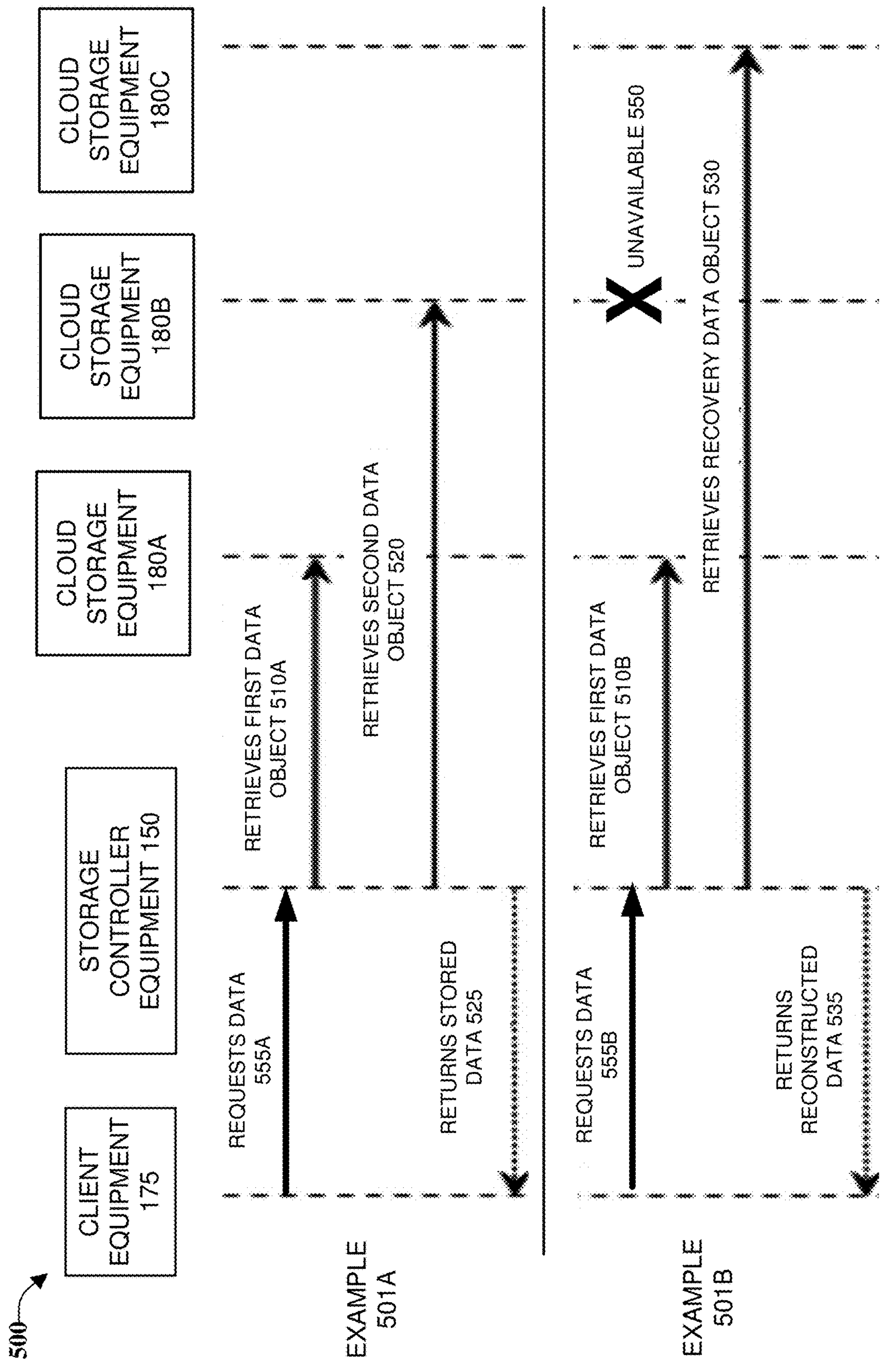
FIG. 5 includes a sequence diagram that illustrates aspects of example system that can facilitate using object metadata to recover object data, in accordance with one or more embodiments.

FIG. 5 includes a sequence diagram that illustrates aspects of example system 500 that can facilitate using object metadata to recover object data, in accordance with one or more embodiments. For purposes of brevity, description of like elements and/or processes employed in other embodiments is omitted. System 500 depicts examples 501A-B with exchanges of data among storage controller equipment 150, client equipment 175, and cloud storage equipment 180A-C.

Example 501A begins with client equipment 175 requesting data 555A from storage controller equipment 150. At 510A, storage controller equipment 150 retrieves first data object (e.g., data object 185A) from cloud storage equipment 180A and at 520, storage controller equipment 150 retrieves second data object (e.g., data object 185B) from cloud storage equipment 180B. At 525, the combination of the first and second data objects may be communicated to client equipment 175 in response to the requesting of 555A.

Example 501B begins with client equipment 175 requesting data 555B from storage controller equipment 150. In this example, cloud storage equipment 180B (and the second data object) is unavailable 550 for combining with the first data object. At 510A, storage controller equipment 150 retrieves first data object (e.g., data object 185A) from cloud storage equipment 180A. Because the second data object is stored at cloud storage equipment 180B, and is thus unavailable 550, at 530, the recovery data object (e.g., recovery object 182) is retrieved.

An additional benefit that may be achieved by employing user-defined metadata to distribute and reassemble objects across a single or multiple object providers is that client applications do not need to be altered to achieve redundancy/be aware of backend Cloud Providers. That is, no centralized controller for object storage locations needs to be used by client applications to effect object storage/recovery. In some implementations, based on the services provided by storage controller equipment 150 described herein, these functions may be implemented using a client storage tool component at client equipment 175, e.g., based on the small footprint of the component code.

At 535, after reconstruction of the second data object based on the first data object and the recovery data, the reconstructed data may be communicated to client equipment 175. At 525, the combination of the first and second data objects may be communicated to client equipment 175 in response to the requesting of 555A.

Figure 6:
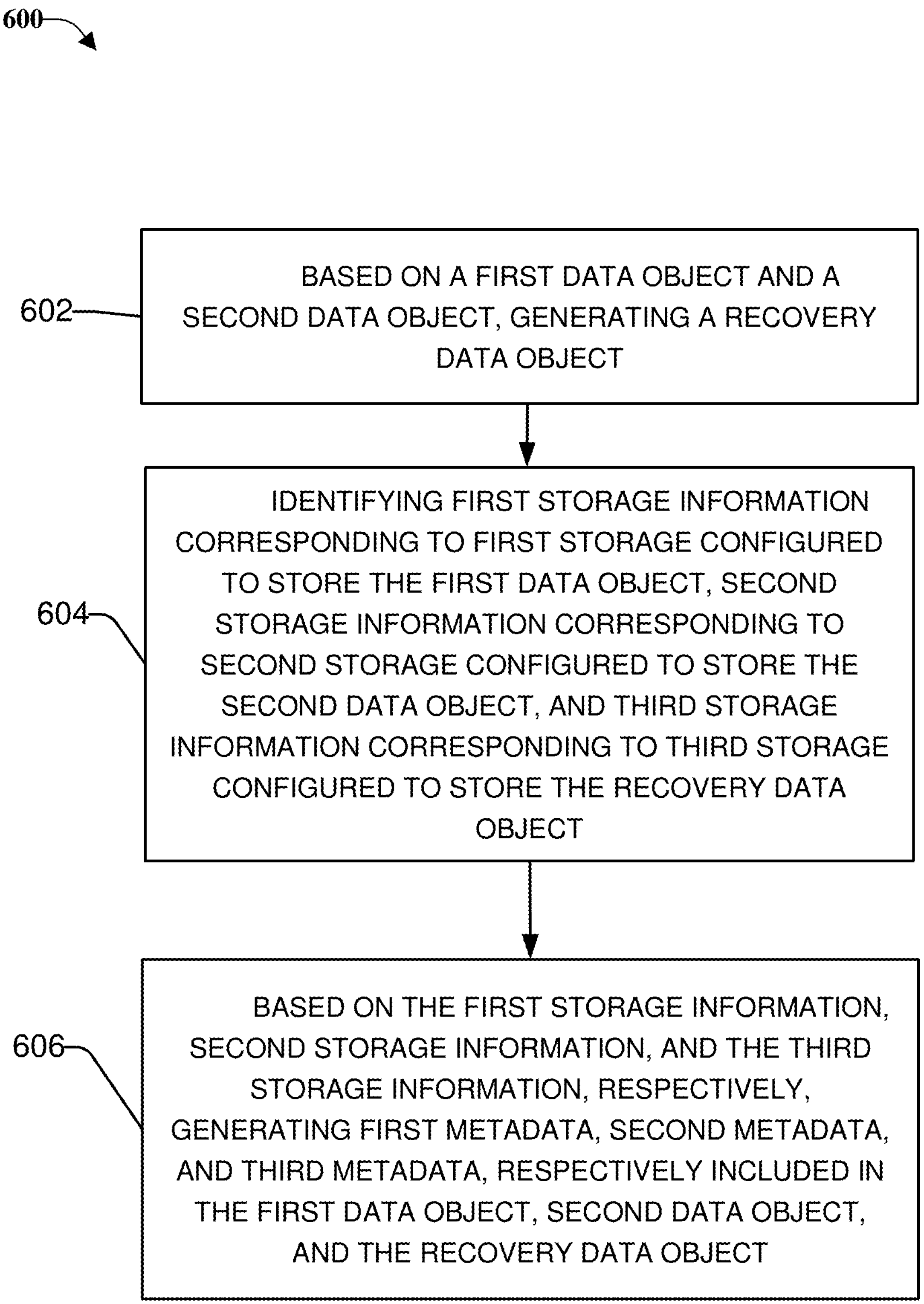
FIG. 6 depicts a flow diagram representing example operations of an example method that can facilitate using object metadata to chunk, store, and recover object data, in accordance with one or more embodiments.

FIG. 6 depicts a flow diagram representing example operations of an example method 600 that can facilitate using object metadata to chunk, store, and recover object data, in accordance with one or more embodiments. For purposes of brevity, description of like elements and/or processes employed in other embodiments is omitted.

In some examples, one or more embodiments of method 600 can be implemented by redundancy component 122, storage component 124, recovery component 126, and other components that can be used to implement aspects of method 600, in accordance with one or more embodiments. FIG. 6, described below illustrates methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

At 602 of method 600, redundancy component 122 of storage controller equipment 150 may, based on a first data object and a second data object, generate a recovery data object. At 604 of method 600, storage component 124 may identify first storage information corresponding to first storage configured to store the first data object, second storage information corresponding to second storage configured to store the second data object, and third storage information corresponding to third storage configured to store the recovery data object. At 606 of method 600, recovery component 126 may, based on the first storage information, second storage information, and the third storage information, respectively, generate first metadata, second metadata, and third metadata, respectively included in the first data object, second data object, and the recovery data object.

Figure 7:
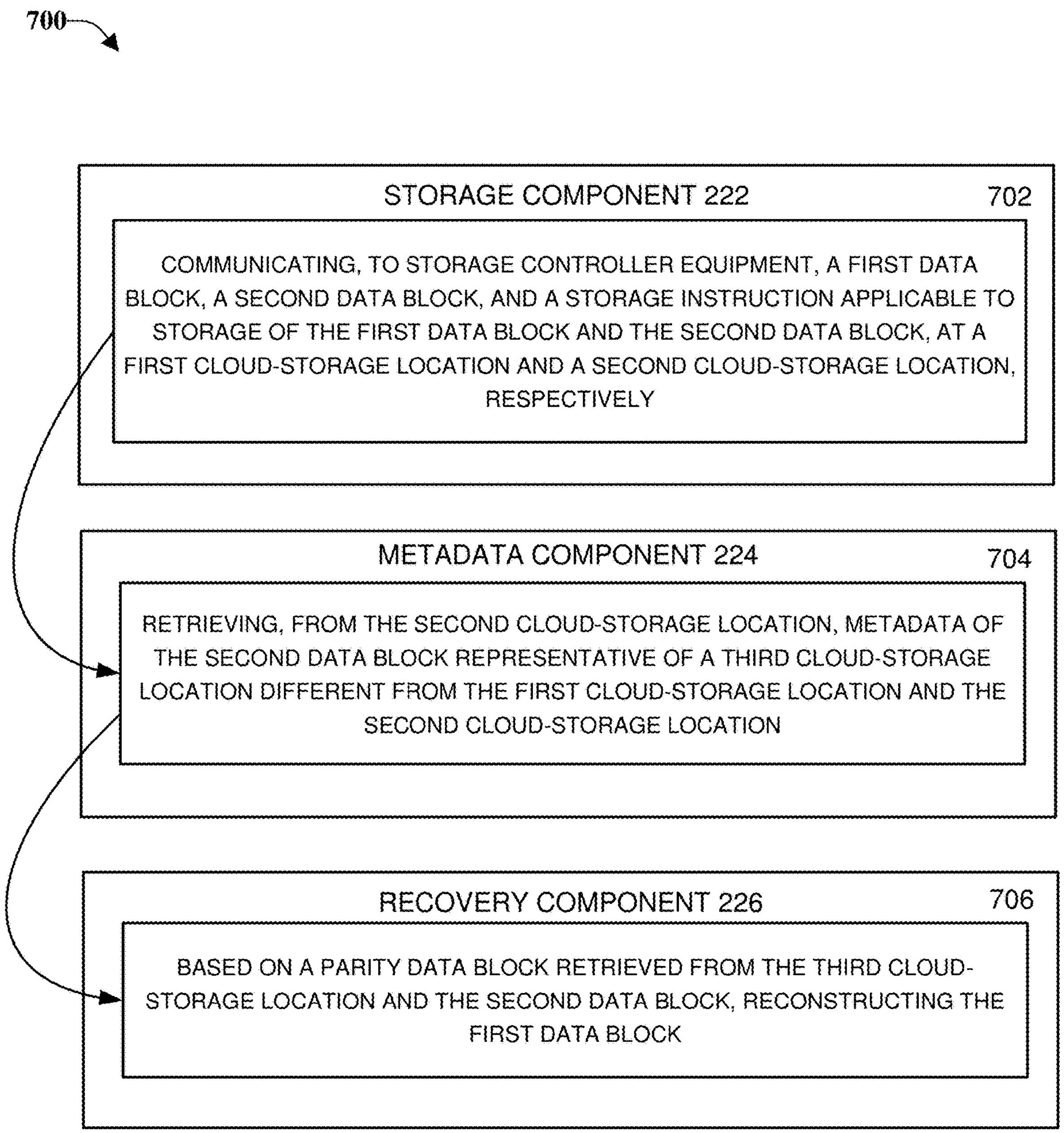
FIG. 7 depicts an example system that can facilitate using object metadata to chunk, store, and recover object data, in accordance with one or more embodiments.

FIG. 7 depicts an example system 700 that can facilitate using object metadata to chunk, store, and recover object data, in accordance with one or more embodiments. For purposes of brevity, description of like elements and/or processes employed in other embodiments is omitted.

System 700 includes at least one memory that stores computer executable components, and at least one processor that executes the computer executable components stored in the at least one memory, with the computer executable components including storage component 222, metadata component 224, recovery component 226, and other components that can be used to implement aspects of system 700, as described herein, in accordance with one or more embodiments.

At 702 of FIG. 7, storage component 222 can communicate, to storage controller equipment, a first data block, a second data block, and a storage instruction applicable to storage of the first data block and the second data block, at a first cloud-storage location and a second cloud-storage location, respectively. At 704 of FIG. 7, metadata component 224 can retrieve, from the second cloud-storage location, metadata of the second data block representative of a third cloud-storage location different from the first cloud-storage location and the second cloud-storage location. At 706 of FIG. 7, recovery component 226 can, based on a parity data block retrieved from the third cloud-storage location and the second data block, reconstruct the first data block.

Figure 8:
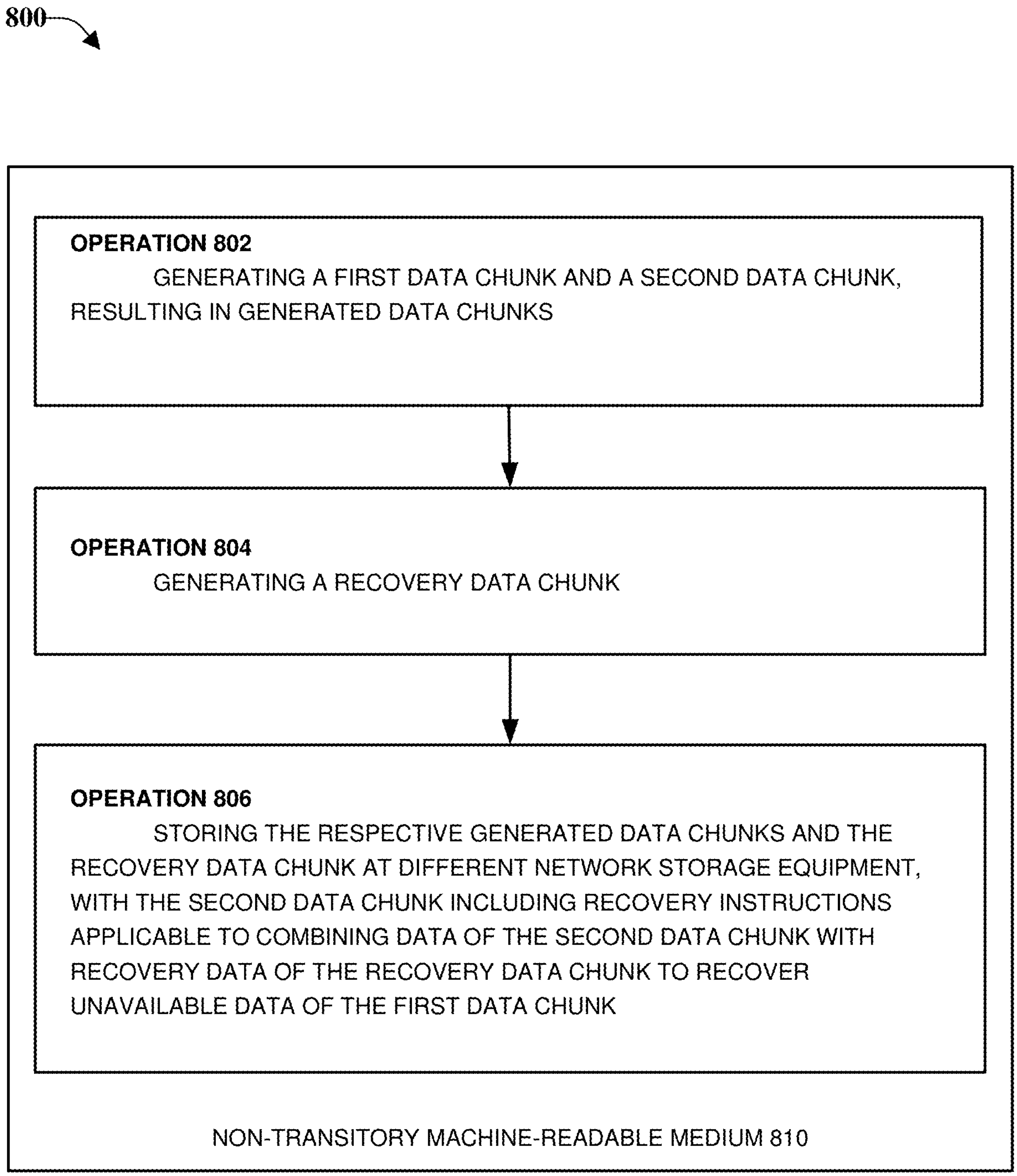
FIG. 8 depicts an example non-transitory machine-readable medium that can include executable instructions that, when executed by a processor of a system, can facilitate using object metadata to chunk, store, and recover object data, in accordance with one or more embodiments.

FIG. 8 depicts an example 800 non-transitory machine-readable medium 810 that can include executable instructions that, when executed by a processor of a system, can facilitate using object metadata to chunk, store, and recover object data, in accordance with one or more embodiments. For purposes of brevity, description of like elements and/or processes employed in other embodiments is omitted.

As depicted, non-transitory machine-readable medium 810 includes executable instructions that, when executed by at least one processor of a machine learning device, facilitate performance of operations that include operation 802 which may generate a first data chunk and a second data chunk, resulting in generated data chunks. The operations may further include operation 804 which may generate a recovery data chunk. The operations may further include operation 806 which can store the respective generated data chunks and the recovery data chunk at different network storage equipment, with the second data chunk including recovery instructions applicable to combining data of the second data chunk with recovery data of the recovery data chunk to recover unavailable data of the first data chunk.

Figure 9:
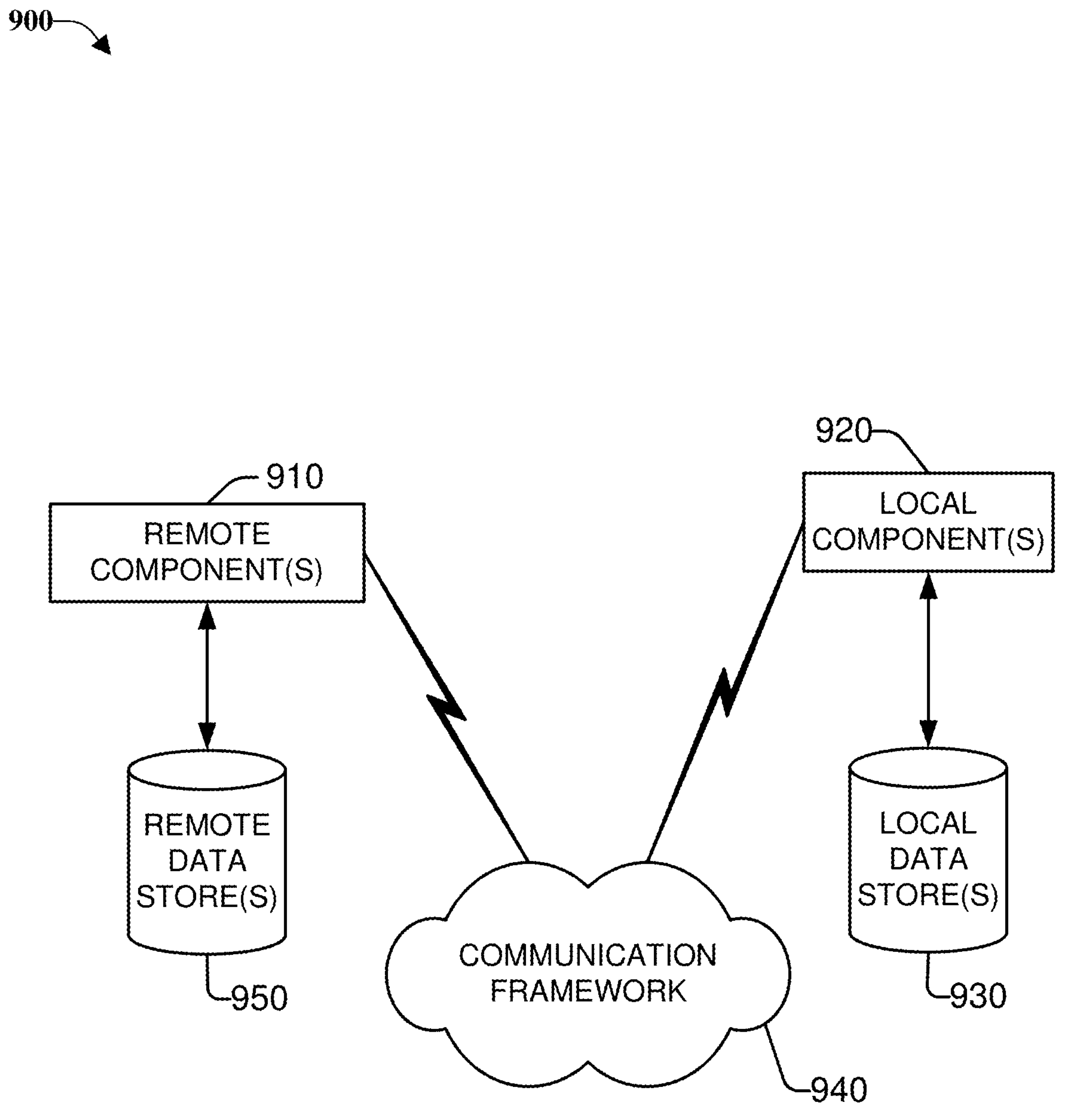
FIG. 9 is a schematic block diagram of a system with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, RAN devices, gateway devices, femtocell devices, servers, etc. The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in different systems, e.g., both local and remote memory storage devices.

Figure 10:
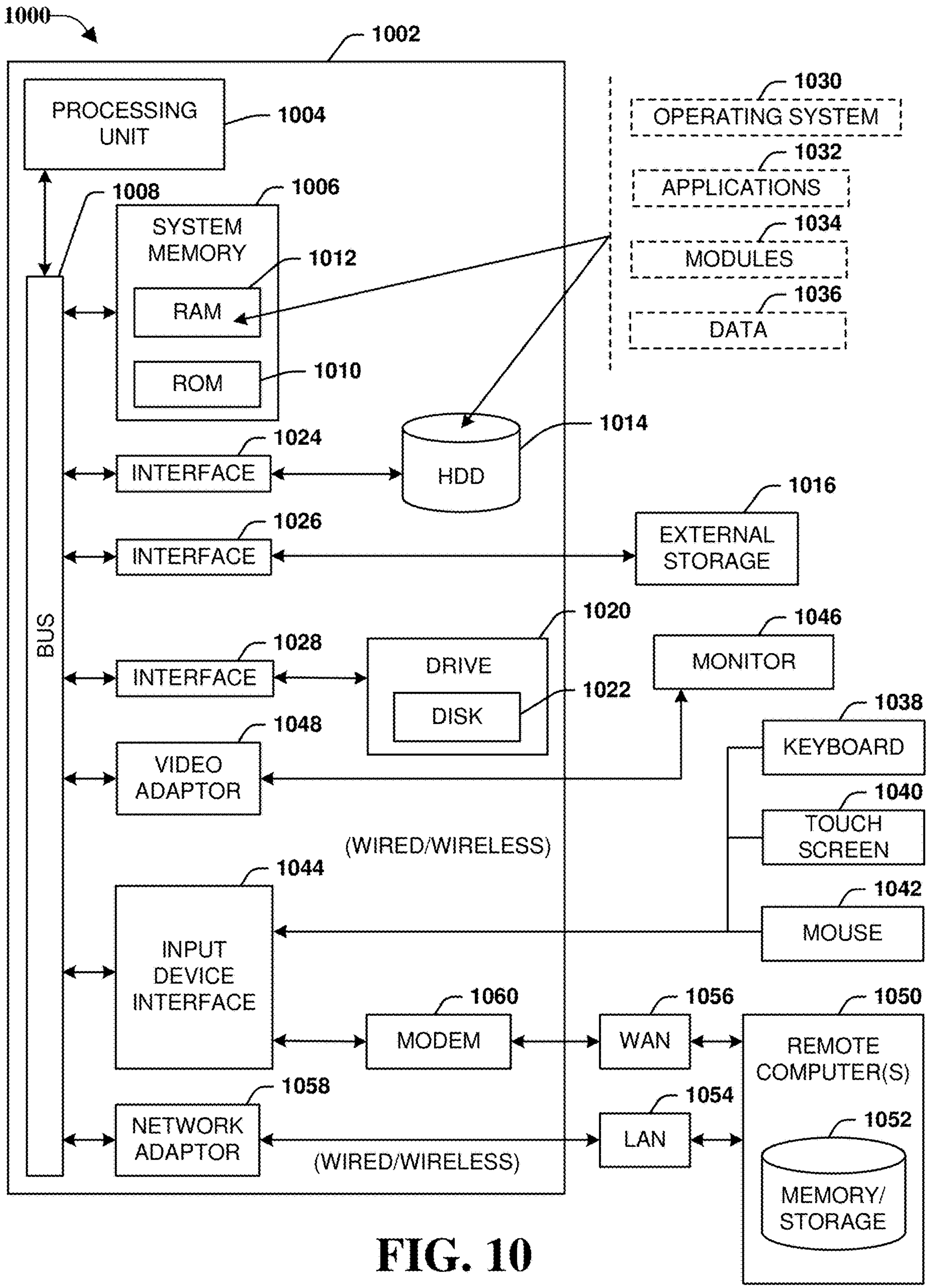
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can also be connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application program interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2(3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) RAN or GERAN; UMTS Terrestrial Radio Access Network (UTRAN); or LTE Advanced.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

based on a first data object of data objects and a second data object of the data objects, generating, by a computing system comprising one or more processors, a recovery data object applicable to using parity data to recover the first data object based on the second data object;

identifying, by the computing system:

first storage information corresponding to first storage configured to store the first data object at a first storage provider managed by a first entity, second storage information corresponding to second storage configured to store the second data object at a second storage provider different from the first storage provider, wherein the second storage provider is managed by a second entity different from the first entity, and third storage information corresponding to third storage configured to store the recovery data object;

determining, by the computing system, that recovery of the first data object will undergo a recovery performance improvement based on employing metadata of the data objects to store the first storage information, the second storage information, and the third storage information, resulting in a determination;

based on the determination and the first storage information, the second storage information, and the third storage information, respectively, generating, by the computing system, first metadata, second metadata, and third metadata, respectively comprised in the first data object, second data object, and the recovery data object; and based on the recovery data object, recovering, by the computing system, the first data object based on the second data object.

2. The method of claim 1, wherein the recovering of the first data object resulted from combining the second metadata and the third metadata, resulting in a recovered first data object.

3. The method of claim 2, wherein the recovering of the first data object comprises:

employing the second metadata to identify the third storage information;

based on the third storage information, retrieving the recovery data object from the third storage; and combining the second data object and the recovery data object, resulting in the recovered first data object.

4. The method of claim 1, wherein the second metadata identifies the first storage as storing the first data object and the third storage as storing the recovery data object.

5. The method of claim 1, wherein the first storage provider comprises cloud storage equipment associated with a cloud-storage provider, and wherein the first entity comprises the cloud-storage provider.

6. The method of claim 1, further comprising:

receiving, by the computing system, an encryption key from a client system; and based on the encryption key, encrypting, by the computing system, the first metadata.

7. The method of claim 1, further comprising, before generating the recovery data object, receiving, by the computing system, from a client system, the first data object and the second data object.

8. The method of claim 1, further comprising, based on client data received from a client system, generating, by the computing system, the first data object and the second data object.

9. A computing system, comprising:

at least one memory that stores computing executable instructions; and at least one processor configured to process the computing executable instructions that, when executed by the at least one processor, facilitate performance of operations, comprising:

based on a first data object of data objects and a second data object of the data objects, generating a recovery data object applicable to using parity data to recover the first data object based on the second data object;

identifying:

first storage information corresponding to first storage configured to store the first data object at a first cloud storage provider managed by a first entity, second storage information corresponding to second storage configured to store the second data object at a second cloud storage provider different from the first cloud storage provider, wherein the second storage provider is managed by a second entity different from the first entity, and third storage information corresponding to third storage configured to store the recovery data object;

determining that recovery of the first data object will undergo a recovery performance improvement based on employing auxiliary of the data objects to store the first storage information, the second storage information, and the third storage information, resulting in a determination;

based on the determination and the first storage information, the second storage information, and the third storage information, respectively, generating auxiliary data comprising first auxiliary data, second auxiliary data, and third auxiliary data, respectively comprised in the first data object, second data object, and the recovery data object; and based on the parity data, recovering the first data object based on the second data object.

10. The computing system of claim 9, wherein the operations further comprise, before the generating of the recovery data object, receiving from client equipment, the first data object and the second data object.

11. The computing system of claim 10, wherein the data objects comprise application data of the client equipment.

12. The computing system of claim 10, wherein the first cloud storage provider was selected based on a storage instruction that was received from the client equipment.

13. The computing system of claim 10, wherein the operations further comprise receiving an encryption key from the client equipment, and wherein the recovering of the first data object comprises decrypting the auxiliary data with the encryption key.

14. The computing system of claim 9, wherein the computing system comprises storage controller equipment.

15. The computing system of claim 9, wherein the first auxiliary data is representative of a location of the first cloud storage provider.

16. The computing system of claim 9, wherein the parity data block comprises exclusive or data corresponding to the first data object and the second data object.

17. A non-transitory machine-readable medium comprising executable instructions that, when executed by at least one processor of a computer system, facilitate performance of operations, the operations comprising:

based on a first data object of data objects and a second data object of the data objects, generating a parity data object applicable to recovery of the first data object based on the second data object;

identifying:

first storage information corresponding to first storage configured to store the first data object at a first storage provider managed by a first entity, second storage information corresponding to second storage configured to store the second data object at a second storage provider different from the first storage provider, wherein the second storage provider is managed by a second entity different from the first entity, and third storage information corresponding to third storage configured to store the parity data object;

determining that recovery of the first data object is threshold likely to undergo a recovery performance improvement based on employing metadata of the data objects to store the first storage information, the second storage information, and the third storage information, resulting in a determination;

based on the determination, the first storage information, the second storage information, and the third storage information, respectively, generating first metadata, second metadata, and third metadata, respectively comprised in the first data object, second data object, and the parity data object; and based on the parity data object, recovering the first data object based on the second data object.

18. The non-transitory machine-readable medium of claim 17, wherein the operations further comprise, before the generating of the parity data object, receiving from a client system, the first data object and the second data object.

19. The non-transitory machine-readable medium of claim 18, wherein the data objects comprise application data of the client system.

20. The non-transitory machine-readable medium of claim 18, wherein the operations further comprise:

receiving an encryption key from the client system, and wherein the recovering of the first data object comprises decrypting the first metadata and the second metadata with the encryption key.

* * * * *